June 11, 1968 W. H. GLAZIER ETAL 3,388,402
OPTICAL CORRELATION
Filed May 20, 1966
2 Sheets-Sheet 1
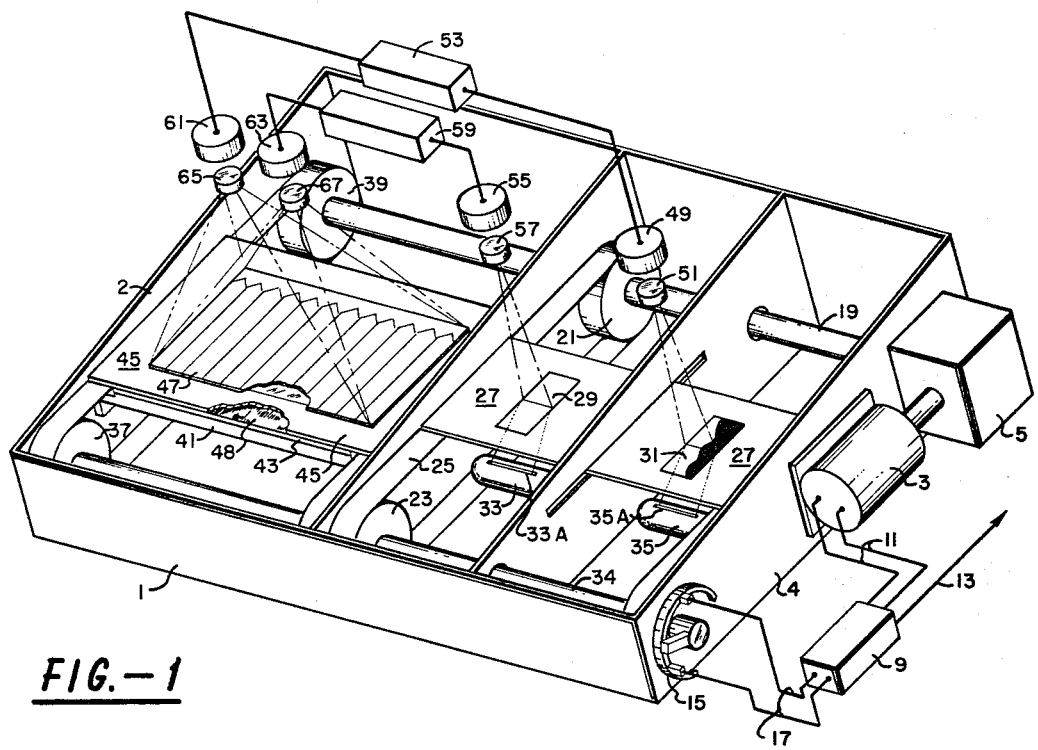
FIG.—1
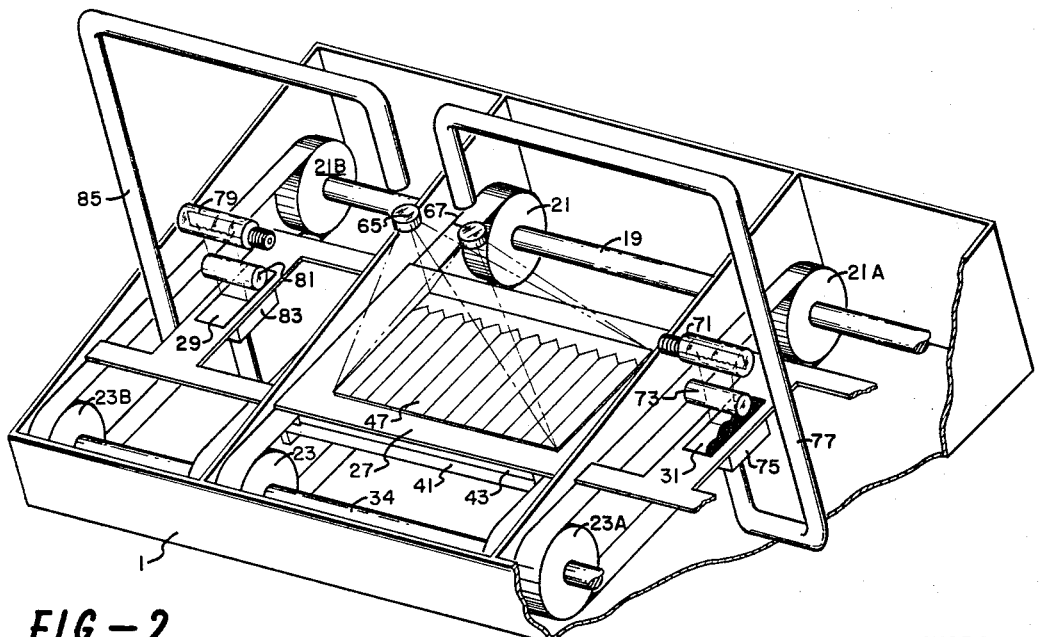
FIG.—2
WALTER H. GLAZIER INVENTORS
& HARLAND H. HEFFRING
BY *John B Davidson*
ATTORNEY

WALTER H. GLAZIER & HARLAND H. HEFFRING  INVENTORS

BY *John B Davidson*
ATTORNEY

United States Patent Office 3,388,402
Patented June 11, 1968

3,388,402
OPTICAL CORRELATION
Walter H. Glazier and Harland H. Heffring, Calgary, Alberta, Canada, assignors to Esso Production Research Company, a corporation of Delaware
Filed May 20, 1966, Ser. No. 551,572
5 Claims. (Cl. 346—1)

This invention relates to the art of optical filtering, and more particularly to a technique for optically filtering a first optical function with a second variable function having both positive and negative values.

One of the areas in which optical filtering has been found to have great utility is that of the processing of seismograms wherein the seismogram is formed as an optical function adapted for convolution with a variable function. Seismograms are formed by producing a seismic disturbance at or near the earth's surface and detecting the resulting seismic waves at one or more detecting locations more or less spaced from the location at which the disturbances is produced. A multitrace seismogram is conventionally formed either by recording the output signals of a multiplicity of seismic detectors produced as the result of a single seismic disturbance, or recording a single detector's output signals produced as a result of a multiplicity of seismic disturbances at spaced-apart locations on the earth's surface. The seismogram is formed by recording traces of the output signals of the geophones in a side-by-side manner on the same time scale to simulate a reasonable cross section of the earth under study. Timing marks, indicating predetermined time intervals, are simultaneously recorded with the seismic signals to indicate the amount of time along each trace. Conventionally, the seismograms are formed on magnetic tape from which the recorded signals can be reproduced to form visible records using well-known techniques. Conventional visible records which can be termed optical functions include variable density seismograms and variable area seismograms wherein light transmissibility is a function of the ampltiude of the recorded signal or signals. In order to facilitate the interpretation of the seismograms, it is desirable to filter or convolve the seismograms so as to make easier the correlation of the various traces in the seismogram to glean useful geological information therefrom. In one optical filtering technique, light rays are passed through a seismogram in which the traces are in either variable density or variable area form, so that light transmissibility therethrough is a function of the seismic signals and the intensity of the light rays is varied as a function of time in accordance with a filter function. The seismogram is simultaneously moved passed the light source and a photographic record is formed of the light rays passing therethrough. The resulting record is a convolution of the seismogram and the filter function.

In conventional optical filtering, there is the restriction that only those functions that have no negative values can be handled. To filter optically with impulse responses that contain negative values, it is necessary to add a bias to the impulse response in order to make it positive at all times. This added bias inevitably distorts the desired filter characteristics; therefore, it is desirable to provide an optical filtering system wherein this objectionable feature is eliminated.

In accordance with one aspect of the invention, a first optical function and a second variable function are convolved by using a photographic film having a positive gamma characteristic for light of one wavelength, and a negative gamma characteristic for light of a second wavelength. An image of the optical function is directed at the photographic film using light of the first wavelength as well as light rays of the second wavelength. The image is moved along the film and the intensity of the light rays of the first wavelength is varied in accordance with the sum of the variable function and a steady bias function. The intensity of the light rays of the second wavelength are simultaneously varied in accordance with the bias function alone. Thus, the density of the image produced on the photographic film at any given time varies in accordance with the variable function alone inasmuch as the bias function is substracted out by the light waves of the second wavelength.

Objects and features of the invention not apparent from the above discussion will become evident upon consideration of the following detailed description thereof taken in accordance with the accompanying drawings, wherein:

FIG. 1 is a simplified view, partially in schematic form, illustrating one embodiment of the invention;

FIG. 2 is a fragmentary view of apparatus largely similar to that of FIG. 1 illustrating another embodiment of the invention;

Figure 5:
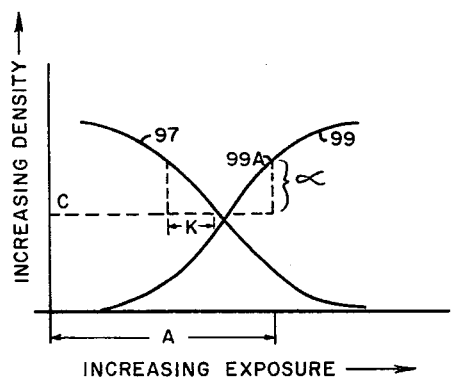
FIG. 5 is a presentation of curves of density as a function of total exposure for photographic film having both positive and negative gamma characteristics.

Before proceeding with the discussion of the embodiments of the invention illustrated in FIGS. 1 and 2, it should be pointed out that the present invention makes use of planar photosensitive recording means, such as photographic film or photographic paper, having both a negative gamma characteristic and a positive gamma characteristic. Much of the photographic film and paper in common use has a positive gamma characteristic such as illustrated by curve 99 in FIG. 5; that is to say, the density of the film increases with the total exposure thereof. Other films exhibit a negative gamma characteristic as illustrated by curve 97 of FIG. 5 where the density of the film decreases as the total quantity of light impinging thereon increases. Other films have a positive gamma characteristic for light of one wavelength, and a negative gamma characteristic for light of another wavelength. Such film is well known to the art and is known by terms such as photochromic film and auto-positive film. Thus, a given quantity of light of one wavelength will increase the density of the film by a certain amount, and a given quantity of light (not necessarily the same quantity) of another wave length can be used to decrease the density by the same amount. The final density of the recording will be determined by the density produced by light of the first wave length plus the density reduction effected by the light of the second wave length.

With reference again to FIG. 5, let it be assumed that the total light of the first wave length impinging on the film is the amount indicated by A on the exposure axis, and the amount of light in the second wavelength is that indicated by the letter K. The final density of the recording at the particular spot on the film at which the light impinged would be that at point C on the density axis. The light of the first wavelength along would produce a density as indicated at point 99A, and the light of the second wave length would reduce the density by the amount α.

With reference now to FIG. 1 of the drawing, there is shown a frame 1 in which there is mounted a pair of horizontally spaced-apart shafts 19 and 34 journalled in end sections 2 and 4 of the frame. Shaft 19 has mounted thereon several pulleys, two of which are designated by the reference numerals 21 and 39, and shaft 34 has mounted thereon several pulleys, two of which are designated by the reference numerals 23 and 37. Corresponding pairs of pulleys, for example pulleys 37 and 39, carry belts for carrying an elongated carrier member 45 that supports a seismic section holder or frame which has mounted therein a film 47 upon which has been previously recorded a seismogram in the usual manner. A frame 41 for holding an unexposed recording medium or film 48 is secured to the frame 1. Recording film 48 is supported by frame 41 in any conventional manner, such as by tape, clamps, etc. The seismic section holder may have an opaque outer section and a transparent rectangular inner section upon which the seismic section film is placed. The seismic section film 47 preferably has recorded thereon a seismic section or seismogram in variable density form, although a variable area type of presentation also is suitable. If the seismic section does not cover all the transparent area, then the area not covered can be blanked out by opaque tape or other material. In operation, the recording film 48 remains stationary while the seismic section 47 slides or moves across the top thereof.

The shaft 19 is driven by an electrical motor 3 through a gear box 5. The electrical motor is energized from a suitable power line 13 through a control box 9, electrical leads 17 and 11, and reversing switch 15. Apparatus of this nature is well known to the prior art and is described in U.S. patent application Ser. No. 331,655 of W. H. Glazier et al. Also supported by the carrier member 45 is a pair of function generating transparencies 29 and 31. A pair of collimated light sources 33, 35 respectively having collimated slits 33A, 35A therein are positioned on one side of the holder 45, and light detectors 55 and 49 and focusing lenses 57 and 51 are positioned on the other side of the holder 45. A slit of light from source 33 thus will pass through the function generating transparency 29 and focused by lens 57 onto light detector 55. Similarly, the slit of light from source 35 will pass through transparency 31 and will be detected by detector 49 after being focused thereon by lens 51. The output signals from detectors 55 and 49 are respectively amplified by amplifiers 59 and 53 to energize light sources 63, 61, respectively. The light emanating from the sources 61, 63 is respectively focused by lenses 65 and 67 so as to impinge upon the seismic section 47. Light sources 61, 63 produce light of different wavelengths. The wavelength of the light from source 61 is chosen to be within the range that affects the photosensitive recording means 48 so that it has a positive gamma characteristic. The wavelength of the light from source 63 is chosen to be within the range to which the photosensitive recording means or film 48 has a negative gamma characteristic. Thus, an increasing total amount of light from source 61 will increase the density of the recording of film 48, whereas the increasing total amount of light from source 63 will decrease the density of the recording of film 48.

Figure 3:
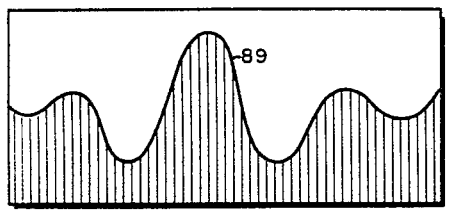
FIG. 3 is a waveform representation of a variable function to be convolved.
Figure 4:
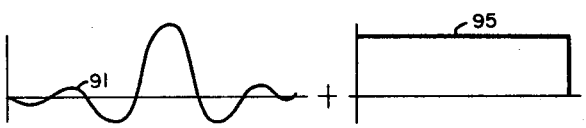
FIG. 4 illustrates waveforms depicting that FIG. 3 is the sum of a variable function and a steady state or bias function.

Before proceeding with the discussion of the operation of FIG. 1, reference is made to FIGS. 3 and 4 for a description of the filter function comprising transparencies 29 and 31. In FIG. 3 there is illustrated a filter function such as is illustrated in FIG. 1 and designated by the reference numeral 31. The portion of the transparency below the line 89 is opaque to light, whereas the portion above the line is transparent to light. Thus, at any point along the X axis of the transparency, the amount of light passed will be a function of the portion of the transparency above the line 89. It can be readily appreciated that actually the function is comprised of a variable portion, as illustrated by the curve 91 of FIG. 4, plus a fixed bias, as illustrated by the curve 95. If the fixed bias 95 were subtracted from the filter function illustrated in FIG. 3, the result would be a variable function as designated by the curve 91 of FIG. 4. The fixed bias can be photographically represented by a transparent photographic film, the entirety of which is a desired shade of gray, the light transmissibility decreasing in accordance with the darkness of the gray coloration of the bias film filter function.

The operation of the apparatus described above is as follows. Let it be assumed that the support member 27 is positioned so that the light from sources 33 and 35 illuminate lines on the upper edges, as viewed, of transparencies 29 and 31. When motor 3 is energized, the motor will drive shaft 19 so that the support member 27 is moved upwardly, as viewed. The light from sources 33 and 35 will pass through the transparencies and will be detected by light detectors 49 and 55. The electrical signals produced thereby will be amplified by amplifiers 53, 59 and used to vary the intensity of the light produced by sources 61, 63. The light produced by source 63 will be effective to reduce the density of the image produced by source 61 by an amount equal to the D.C. bias of the electrical output from source 49. Thus, the variation in the density of the image produced on film 48 will vary in accordance with the density of the seismic section 47 and the intensity of the light produced by the alternating current component of the output signal of amplifier 53. The image produced on film 48 will be a convolution of the alternating current portion of the output signal of detector 49 and the entirety of the seismogram. Actually, only the central portion of the image produced on film 48 will be the convolution of the entirety of the seismogram with the alternating portion of the output signal of detector 49 so that the end portions of the film can be cut off. The reversing switch 15 will reverse the direction of rotation of motor 3 so that the seismic section 47 and the filter function transparencies 29 and 31 are moved back and forth the desired number of times to produce the image of desired density on film 48.

Manifestly, an appropriate cover or hood will be placed over frame 1, and suitable support equipment will be used to properly position the light sources and lenses described above. This is well within the skill of the art and is not shown in order to avoid unnecessarily cluttering the drawing.

The embodiment of the invention illustrated in FIG. 2 is in many respects the same as that in FIG. 1. The motor 3, gearing box 5, and the electrical circuit for the motor are not shown. Furthermore, the carrier member 27 has been extended to the left, as viewed, and transparency 29 has been moved to the other side of seismic section 47. In place of the light detectors 49 and 55, amplifiers 53 and 59, and light sources 61 and 63, there is utilized light pipes 77 and 85 (which may be fiberoptic light conductors well known to the art) to detect light from light sources 71 and 79, respectively, and to conduct the light to appropriate positions over the seismic section 47 whereby lenses 65 and 67 focus the light emanating from the ends of light pipes 77 and 85 on the seismic section 47 and film 48. The light from a linear, collimated light source 71 is condensed by lens 73 and directed as a linear beam on filter function transparency 31. The light passing through the filter function transparency 31 is directed by a line-to-spot light transducer 75 to one end of light pipe 77. Similarly, light from collimated light source 79 is condensed by condensing lens 81 passed through filter function transparency 29 and directed by line-to-spot light transducer 83 on one end of light pipe 85. As described above, the light is transmitted by light pipes 77 and 85 to the lenses 67 and 65. The line-to-spot transducers 75 and 83 may be of the type utilizing fiberoptics such as are described below with respect to FIGS. 6 and 7.

Figure 6:
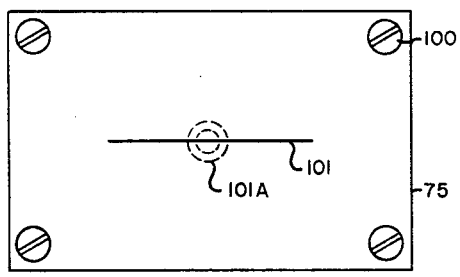
FIG. 6 is a top view of a line-to-spot transducer for use in the apparatus of FIG. 2.
Figure 7:
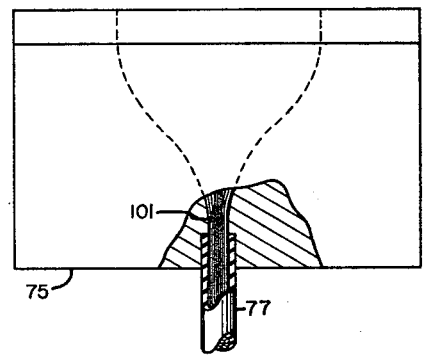
FIG. 7 is a side view, partially in cross section, of the apparatus of FIG. 6.

The line-to-spot transducers 75 and 83, as illustrated in FIGS. 6 and 7, comprise a light-tight housing having a slit in one side thereof in which are positioned a line of fiberoptic elements 101. The fiberoptic elements 101 are gathered into a round bundle into the pipe 77. The pipe 77 extends into the housing in the side thereof opposite the slit. The fiberoptic elements extend through the pipe so as to direct light at the appropriate lens of lenses 65, 67. Other line-to-spot light transducers known to the art may be used.

The support member 27 is supported by belts driven by pulleys or rollers 21, 21A, and 21B on drive shaft 19, and pulleys 23, 23A, and 23B on drive shaft 34. The operation of the apparatus of FIG. 2 is substantially as described above with respect to FIG. 1.

Although the embodiments disclosed in the preceding specification are preferred, other modifications will be apparent to those skilled in the art which do not depart from the scope of the broadest aspects of the invention.

What is claimed is:

1. A method of optical convolution of a first optical function and a second variable function, comprising:

on a planar photosensitive recording means having a positive gamma characteristic for light of one wave length and a negative gamma characteristic for light of a second wave length, directing an image of a first function with first light rays of said one wave length, and second light rays of said second wave length; and moving said image on said planar recording means and simultaneously varying the intensity of said first light rays in accordance with the sum of said second function and a bias function, and of said second light rays in accordance with said bias function.

2. The method of claim 1 wherein said first light rays are varied by varying the intensity of a first light source producing said first light rays in accordance with variations in an electrical signal having an amplitude indicative of said first function, and wherein said second light rays are varied by varying the intensity of a second light source producing said second light rays in accordance with variations in an electrical signal having an amplitude indicative of said bias function.

3. The method of claim 1 wherein said first light rays are varied by directing collimated light rays from a first light source to one end of a light wave guide, the other end of which is positioned so that light therefrom is directed at said planar photosensitive recording means, and passing between said light source and said light wave guide a phototransparency having a light transmission characteristic indicative of said second function, and wherein said second light rays are varied by directing collimated light rays from a first light source to one end of a second light wave guide, the other end of which is positioned so that light therefrom is directed at said planar photosensitive recording means, and passing between said second light source and said second light wave guide a photo-transparency having a light transmission characteristic indicative of said bias function.

4. Apparatus for optical convolution of a first planar optical function and a second variable function, comprising:

first and second collimated light sources for producing linear light beams of first and second wave lengths, respectively;

support means for holding a photographic film;

photosensitive recording means in said support means having a positive gamma characteristic for light of a first wave length and having a negative gamma characteristic for light of a second wave length;

a first visible display representative of the sum of said second variable function and a bias function;

a second visible display representative of said bias function alone;

means for moving said first optical function parallel to and relative to said photographic film;

first means for directing light rays of a first wave length at said film, the light rays of which are variable responsive to variations in said first visible display; and second means for directing light rays of said second wave length at said film responsive to variations in said second visible display.

5. The apparatus of claim 4 wherein said first visible display is a photo-transparency and wherein said first means for directing light rays comprises a first collimated light source, first light wave guide means, means for directing light from said source at one end of said light wave guide means, and means for directing light from the other of said light wave guide means at said photographic film; and wherein said second means for directing light rays comprises a second collimated light source, second light wave guide means, means for directing light from said second source at one end of said second light wave guide means, and means for directing light from the other end of said second light wave guide means at said photographic film; said apparatus further including means for moving said first optical function between said first source and said one end of said light wave guide means and for moving said second optical function between said second source and said one end of said second light wave guide means concurrently with movement of said first optical function relative to said film.

References Cited

UNITED STATES PATENTS

| | | | |
|---|---|---|---|
| 3,254,835 | 6/1966 | Glazie et al. | 346—33 |
| 3,323,103 | 5/1967 | Shaw et al. | 346—33 |

RICHARD B. WILKINSON, *Primary Examiner.*

EDITH C. SIMMONS, *Assistant Examiner.*